May 4, 1937.  R. R. R. SARAZIN  2,079,226
MEANS ADAPTED TO REDUCE THE TORSIONAL OSCILLATIONS OF CRANKSHAFTS
Original Filed July 30, 1931   2 Sheets-Sheet 1
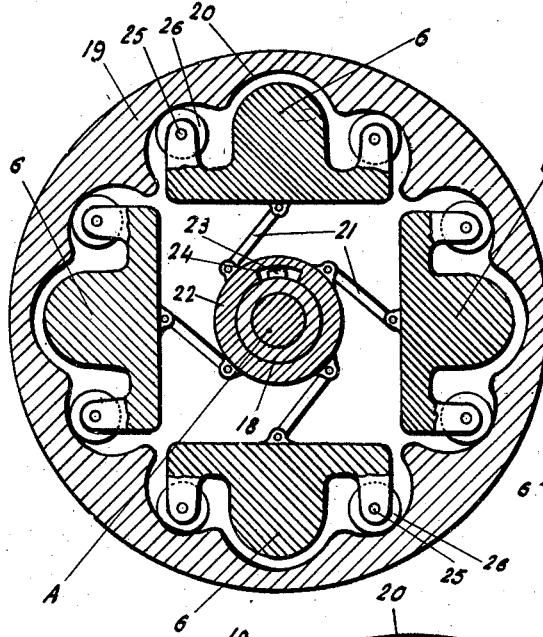
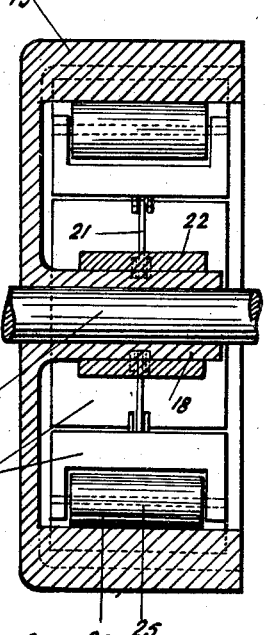
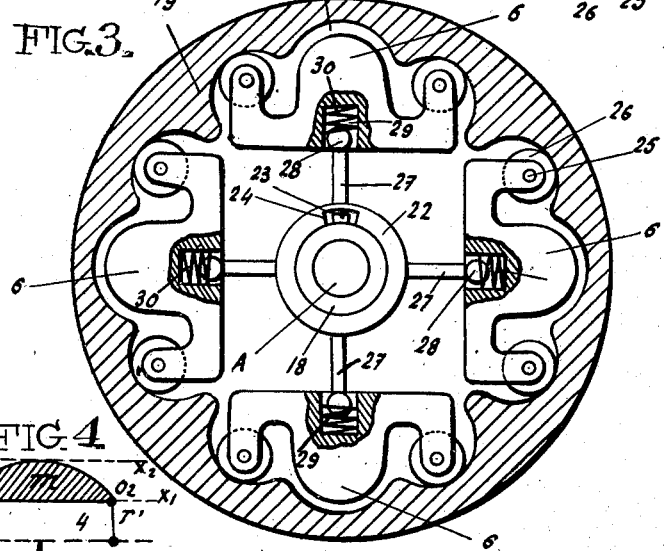
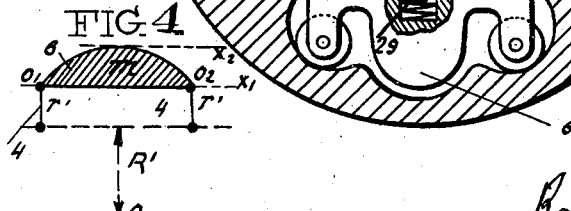
INVENTOR
Raoul R. R. Sarazin
BY Townsend + Decker
ATTORNEYS.

May 4, 1937.   R. R. R. SARAZIN   2,079,226
MEANS ADAPTED TO REDUCE THE TORSIONAL OSCILLATIONS OF CRANKSHAFTS
Original Filed July 30, 1931   2 Sheets-Sheet 2

INVENTOR
Raoul R. R. Sarazin
BY Townsend & Decker
ATTORNEYS

Patented May 4, 1937

2,079,226

UNITED STATES PATENT OFFICE 2,079,226

MEANS ADAPTED TO REDUCE THE TORSIONAL OSCILLATIONS OF CRANKSHAFTS

Raoul Roland Raymond Sarazin, Saint-Prix, France

Application July 30, 1931, Serial No. 554,056. Renewed February 29, 1936. In France December 19, 1930

REISSUED

23 Claims. (Cl. 74—574)

As is well-known, the crank-shafts of motors such as Diesel engines, internal combustion motors and the like, having a variable torque in their revolution, display in any sequence of distribution along their length inertias and resiliencies giving rise, at certain velocities of revolution, to torsional resonance speeds due to the harmonics of the driving torques and to the inertia of the pistons and connecting-rods.

It is generally sought to eliminate such velocities which are dangerous beyond normal speeds of revolution by increasing as far as possible the resilient rigidity of the shaft whilst reducing its inertia.

This invention aims at providing means adapted to reduce the torsional oscillations of said crank-shafts.

A feature of said means consists of the provision of mobile masses adapted to move at an angle relatively to the shaft of the motor, around which they constitute a kind of fly-wheel having inertia relatively to torsional impulses, said masses being so interconnected and connected to the shaft by any suitable means as to ensure permanent balancing of the whole device.

Fly-wheels of this type may be arranged at one or more points intermediate the ends of the shaft of the motor.

Means may be provided to produce, by friction or otherwise, some damping of the angular movements of said masses.

Said masses may likewise be radially movable, so that their centers of gravity may move towards or away from that of the shaft.

In the attached drawings, which show by way of examples various diagrammatical constructional embodiments of the device according to the invention:

Figure 1 is a cross-sectional view of an engine shaft and of a construction of my invention;

Figure 2 is a diametric sectional view in a plane of said shaft;

Figure 3 is a cross-sectional view of a further modified construction;

Figure 4 is a diagram explaining graphically the value of the radii of oscillation of the masses.

Figure 5:
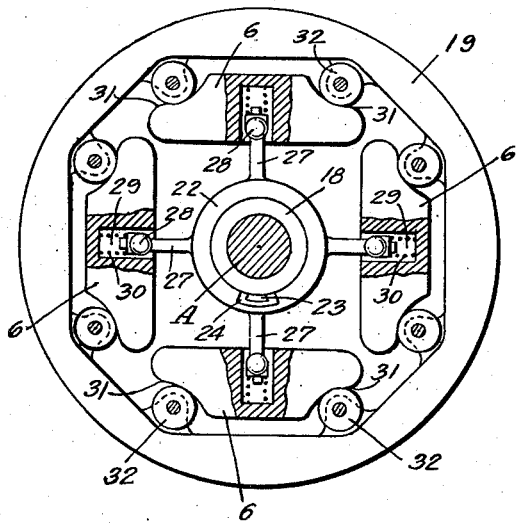
Figure 5 is a cross-sectional view similar to Figs. 1 and 3 but showing a modified construction of mobile masses and means for guiding the same.

In Figs. 1 and 2 a member 19 having inner cavities 20 is keyed upon shaft A, under consideration, by means of a central muff 18. A certain number of masses 6 are adapted to move circularly, in one or other direction, in relation to said member 19 and within the same and are in connection, by means of hinged links 21, with a crown 22 freely revolving upon muff 18. In order that the travel of said masses 6 may be limited, muff 18 carries a spur 23 adapted to strike the two ends of a cavity 24 provided within crown 22.

Each end of the masses 6 carries an axle 25 which itself carries a roll 26, said rolls 26 being constantly applied against the sides of hollows 20 by centrifugal force, when shaft A rotates.

If R denotes the radius of the hollows 20 and $r$ that of rolls 26, the whole sequence follows the same course as though the radius along which each mass 6 moves were equal to $R-r$, and said radius $R-r$ may be as short as may be desired.

In the alternative shown in Fig. 3, masses 6 are connected with crown 22 by means of projecting arms 27 made integral with said crown, each of which ends in an axle or roll 28 freely entering a slot 29 provided in mass 6.

To avoid, upon stoppage taking place, the masses 6 moving radially, springs 30 may be inserted between the bottoms of slots 29 and the axles or rolls 28.

A plurality of such devices may, of course, be fitted at all suitable points along the length of the shaft under consideration; especially in front of the motor and behind the fly-wheel, if the shaft in question is that of a motor having a fly-wheel.

Instead of hollows being provided in a hollow member made integral with the shaft under consideration, said hollows might equally well be made in the mobile masses themselves and bosses (preferably having rolls) made integrally with said shaft being housed in such hollows. Such a construction is illustrated in Figure 5 wherein the mobile masses 6 carried by the ball ends 28 as already described in connection with Figure 3, provide hollows 31 adjacent their opposite ends, said hollows being directed outwardly toward the rim of member 19. Said member 19 is provided with a plurality of rollers, one in each of said hollows, the parts being so arranged that the mobile masses 6 will each rest against a pair of rollers and in normal position will be symmetrical with respect to the axis of shaft A. Under torsional vibrations, said masses will ride upon rollers 32 and thereby assume unsymmetrical positions, the action and reaction tending to dampen high frequency vibrations.

In either alternative, said hollows may be of any desired shape apart from the circular shape.

It has been ascertained that the best results were obtained by giving the radius of each hinged link of the mobile masses (or to the equivalent $R-r$ aforesaid of such radius) a certain value resulting from the following general formula:

$$\frac{mr'}{p} \times n^2 = 1$$

in which, with reference to Fig. 4 which illustrates diagrammatically the principle of the invention:

$m$ is the mass of one of the mobile masses 6,
$n$ is the harmonic to be compensated,
$r'$ is the radius of each link 4 (or equivalent $R-r$)

$$P = \int_{z^1}^{x^1} (R'+x) dm$$

$x$ being the distance from the centre of gravity of mass 6 to line $O_1 O_2$ joining the hinging points of links 4/1 and O the centre of the shaft under consideration.

Should the centre of gravity of the mobile mass be on the straight line $O_1 O_2$, then $$P = mR'$$

and $$\frac{r'}{R'} \times n^2 = 1$$

Having now particularly described and ascertained the nature of my said invention and in what manner the same operates, I declare that what I claim is:

1. In a device for reducing torsional vibrations in shafts, especially vibrations of high frequency, a shaft, a member mounted on said shaft to be rotated thereby, said member having a surface providing hollows therein, and a plurality of swinging masses exterior of and having connection with the shaft and each mass having a pair of separated parts engaging in said hollows and adapted to be swung under influence of a torsional vibration to ride partly out of said hollows.

2. In a device for reducing torsional vibrations in shafts, a shaft, a member fixed to said shaft, said member having a plurality of hollows therein, a plurality of swinging masses having connection with the shaft for transmitting vibrations from the shaft to said masses, means movably retaining said masses at opposite ends of each mass with respect to said member with the retained ends of the masses movable in arcuate paths, the radii of curvature of the paths being less than the radii of rotation of said ends about the axis of the shaft.

3. In a device for reducing torsional vibrations in shafts, a shaft, a hollow member fixed to said shaft, said member having a plurality of hollows therein, a plurality of swinging masses having connection with the shaft for transmitting vibrations from the shaft to said masses, and means for movably retaining each of said masses at two places with respect to said member.

4. In a device for reducing torsional vibrations in shafts, a shaft, a hollow member fixed to said shaft, said member having a plurality of hollows therein, a plurality of swinging masses having connection with the shaft for transmitting vibrations from the shaft to said masses, a projecting boss at two points of each mass, said bosses being urged against the hollow in use under centrifugal effect, and means for maintaining the masses remote from the shaft.

5. In a device for reducing torsional vibrations in shafts, a shaft, a hollow member fixed to said shaft, said member having a plurality of hollows therein, a plurality of swinging masses having connection with the shaft for transmitting vibrations from the shaft to said masses, a projecting boss at two points of each mass, a roller fitted on said boss and applied against the hollow under centrifugal effect, and means for maintainng the masses remote from the shaft.

6. In a device for reducing torsional vibrations in shafts, a shaft, a hollow member fixed to said shaft, said member having a plurality of hollows therein, a plurality of swinging masses having connection with the shaft for transmitting vibrations from the shaft to said masses, projecting bosses on two points of each mass, a roller fitted on each said boss and urged against the hollow in use under centrifugal effect, said connection comprising a collar around the shaft and links hinged to said collar and to said masses.

7. In a device for reducing torsional vibrations in shafts, a shaft, a hollow member fixed to said shaft, said member having a plurality of hollows therein, a plurality of swinging masses having connection with the shaft for transmitting vibrations from the shaft to said masses, each of said masses having a slot, a projecting boss at two points of each mass, a roller fitted on each said boss and urged against the hollow in use under centrifugal effect, said connection comprising a collar around said shaft, one link rigidly mounted on said collar for each swinging mass and entering in the slot of the mass.

8. In a device for reducing torsional vibrations in shafts, a shaft, a hollow member fixed to said shaft, said member having a purality of hollows therein, a plurality of swinging masses having connection with the shaft for transmitting vibrations from the shaft to said masses, each of said masses having a slot, a projecting boss at two points of each mass, a roller fitted on said boss and urged against the hollow in use under centrifugal effect, said connection comprising a collar around said shaft, a plurality of links rigidly mounted on said collar, one for each swinging mass and having a head entering in the slot of the mass and a spring in the slot on the head of said link.

9. A device as claimed in claim 6, in which the radius $r'$ of each hinging link of the swinging masses is given by the formula:

$$\frac{mr'}{p} \cdot n^2 = 1$$

wherein:

$m$ is the mass of one of said swinging masses,
$n$ is the harmonic requiring compensation, $$p = \int^{x^1} (R'+x) dm$$

with reference to Fig. 4 of the drawings.

10. A device as claimed in claim 4, wherein, the center of gravity of the swinging mass is upon the straight line joining the points of the connection between mass and shaft, and the formulae $$p = mR'$$

and $$\frac{r'}{R'} \cdot n^2 = 1$$

are fulfilled, wherein $r'$ is the radius of the means for retaining the swinging masses remote from the shaft, $R'$ is the radius from the center of the shaft to such means, $m$ is the mass of one of said movable masses, $n$ is the harmonic requiring compensation, and $p$ equals $$\int_{z^1}^{z^1} (R'+x)dm$$

with reference to Fig. 3 of the drawings.

11. In a device for reducing vibrations in shafts, a shaft, a first element mounted on said shaft for rotation therewith, a second element, means including two curved paths in one of said elements for operatively connecting the second element with the first element and adapted to permit movement between said elements radially of the shaft and for guiding the movement of said second element, said connecting and guiding means comprising two rollers each movably supported by the other element for turning movement with respect thereto, said rollers and the element which is provided with curved paths being adapted to be urged against each other by centrifugal force with each roller engaging in rolling contact with one of the curved paths, said two rollers forming the sole contact between the element on which they are mounted and said curved paths during relative movement between said elements.

12. In a device for reducing vibrations in shafts, a first element adapted to be mounted on a shaft for rotation therewith, a second element, means including two curved paths in one of said elements for operatively connecting the second element with the first element and adapted to permit movement between said elements radially of the shaft and for guiding the movement of said second element, said connecting and guiding means comprising two rollers each movably supported by the other element for turning movement with respect thereto, said rollers and the element which is provided with curved paths being adapted to be urged against each other by centrifugal force with each roller engaging in rolling contact with one of the curved paths, said two rollers forming the sole contact between the element on which they are mounted and said curved paths during relative movement between said elements, the radii of curvature of the paths being less than the radii of rotation of the rollers about the axis of the shaft.

13. In a device for reducing vibrations in shafts, a member adapted to be fixed to a shaft, said member having two arcuate paths therein, a mass movably mounted relative to the shaft and rotatable relative to the axis of the shaft, and two rollers at two different points of the mass in movable rolling engagement with said arcuate paths on said member to restrain the points to movement in arcuate paths, the radii of curvature of the paths being less than the radii of rotation of said points about the axis of rotation of the shaft, said rollers forming the sole contact between said mass and said arcuate paths during relative movement between said elements.

14. In a device for reducing torsional vibrations in shafts, a shaft, a mass exterior of said and swingably mounted relative thereto, said mass having a normal position with respect to the shaft when subjected to the centrifugal effect alone and adapted to have limited movement both radially with respect to the axis of the shaft, and laterally with respect to said normal position, and two rollers at two different points of said mass cooperating in rolling relation with spaced means fixed to the shaft for controlling both the radial and lateral movements of the mass to a definite arcuate path for each of said points, said two rollers forming the sole contact between the mass and said last means for controlling such radial and lateral movements during relative movement between said elements.

15. In a device for reducing vibrations in shafts, a shaft, a member mounted on said shaft for rotation therewith, a mass, means including a curved path in said member for operatively connecting the mass with said member and adapted to permit movement between said mass and said member radially of the shaft and for guiding the movement of the mass, said connecting and guiding means comprising a roller movably connected to the mass for turning movement with respect thereto, said roller and said member being adapted to be urged against each other by centrifugal force with the roller engaging in rolling contact with said curved path, said roller forming the sole contact between the mass and said curved path during relative movement between said mass and said member.

16. In a device for reducing vibrations in shafts, a shaft, a member mounted on said shaft for rotation therewith, a mass, means including a curved path in said member for operatively connecting the mass with said member and adapted to permit movement between said mass and said member radially of the shaft and for guiding the movement of the mass, said connecting and guiding means comprising a roller movably connected to the mass for turning movement with respect thereto, said roller and said member being adapted to be urged against each other by centrifugal force with the roller engaging in rolling contact with said curved path, said roller forming the sole contact between the mass and said curved path during relative movement between said mass and said member, the radius of curvature of the path being less than the radius of rotation of the axis of said roller about the axis of the shaft.

17. In a device for reducing vibrations in shafts, a member mounted on a shaft for rotation therewith, said member having an arcuate path therein, a mass movably mounted relative to the shaft and rotatable relative to the axis of the shaft and a roller rotatively connected to the mass in movable rolling engagement with said arcuate path on said member to restrain the axis of said roller to movement in an arcuate path, the radius of curvature of said path being less than the radius of rotation of said axis about the axis of rotation of the shaft, said roller forming the sole contact between said mass and said arcuate path during relative movement between said elements.

18. In a device for reducing vibrations in shafts, a shaft, a member mounted on said shaft for rotation therewith, a mass, means including a curved path in said member for operatively connecting the mass with said member and adapted to permit movement between said mass and said member radially of the shaft and for guiding the movement of the mass, said connecting and guiding means comprising a roller movably connected to the mass for turning movement with respect thereto, said roller and said member being adapted to be urged against each other by centrifugal force with the roller engaging in rolling contact with said curved path, said roller forming the sole contact between the mass and said curved path during relative movement between said mass and said member and the center of gravity of said mass being situated a certain constant distance away from the axis of said roller.

19. In a device for reducing vibrations in shafts, a shaft, a member mounted on said shaft for rotation therewith, a mass, means including a curved path in said member for operatively connecting the mass with said member and adapted to permit movement between said mass and said member radially of the shaft and for guiding the movement of the mass, said connecting and guiding means comprising a roller movably connected to the mass for turning movement with respect thereto, said roller and said member being adapted to be urged against each other by centrifugal force with the roller engaging in rolling contact with said curved path, said roller forming the sole contact between the mass and said curved path during relative movement between said mass and said member, the radius of curvature of the path being less than the radius of rotation of the axis of said roller about the axis of the shaft and the center of gravity of said mass being situated a certain constant distance away from the axis of said roller.

20. In a device for reducing vibrations in shafts, a member mounted on a shaft for rotation therewith, said member having an arcuate path therein, a mass movably mounted relative to the shaft and rotatable relative to the axis of the shaft and a roller rotatively connected to the mass in movable rolling engagement with said arcuate path on said member to restrain the axis of said roller to movement in an arcuate path, the radius of curvature of said path being less than the radius of rotation of said axis about the axis of rotation of the shaft, said roller forming the sole contact between said mass and said arcuate path during relative movement between said mass and said member, and the center of gravity of said mass being situated a certain constant distance away from the axis of said roller.

21. In a device for reducing torsional vibrations in shafts, a member mounted on a shaft for rotation therewith, said member having a concave arcuate path therein whose concavity is directed towards the axis of the shaft, and weight means movable radially and angularly with respect to the shaft substantially without friction for counteracting torsional vibrations thereof, said means having a surface in freely rolling engagement with said arcuate path of less radius of curvature than said path, said surface being held in operative engagement with said path by centrifugal force, said path having an intermediate portion further from the axis of the shaft than the parts on either side thereof and said path having a less radius of curvature than the radius of movement of the intermediate portion of said path about the axis of the shaft, said rolling engagement being the sole contact between said weight means and said arcuate path during relative movement between said weight means and member.

22. In a device as claimed in claim 21, the spatial relation between the center of gravity of said weight means and the axis of said roller being constant.

23. In a device for reducing torsional vibrations in shafts, a member mounted on a shaft for rotation therewith, said member having a concave arcuate path therein whose concavity is directed toward the axis of said shaft, said path having an intermediate part further from the axis of the shaft than the parts on either side thereof, and weight means comprising a roller movable radially and angularly with respect to the shaft substantially without friction and in use remaining permanently in freely rolling contact with said concave path and being urged against it under centrifugal effect, the radius of curvature for any given operative portion of said concave path being less than the radius of rotation of the axis of said roller about the axis of the shaft when said roller rests against said given portion.

RAOUL ROLAND RAYMOND SARAZIN.